Dec. 21, 1965 R. J. GILMAN 3,225,348
TRANSMITTER HAVING AN OSCILLATOR CONTROLLED
BY SELECTIVELY SWITCHED CAPACITORS
Filed Nov. 17, 1960 3 Sheets-Sheet 1

ROBERT J. GILMAN
INVENTOR.
BY Rudolph J. Junick
ATTORNEY

Dec. 21, 1965 R. J. GILMAN 3,225,348

TRANSMITTER HAVING AN OSCILLATOR CONTROLLED BY SELECTIVELY SWITCHED CAPACITORS

Filed Nov. 17, 1960 3 Sheets-Sheet 2

ROBERT J. GILMAN
INVENTOR.

BY Rudolph J. Juuck
ATTORNEY

ROBERT J. GILMAN
INVENTOR.

BY Rudolph J. Juick
ATTORNEY

United States Patent Office 3,225,348

Patented Dec. 21, 1965

3,225,348

TRANSMITTER HAVING AN OSCILLATOR CONTROLLED BY SELECTIVELY SWITCHED CAPACITORS

Robert J. Gilman, Wayne, N.J., assignor to Radio Frequency Laboratories, Inc., Boonton, N.J., a corporation of New Jersey Filed Nov. 17, 1960, Ser. No. 70,011
7 Claims. (Cl. 340—351)

This invention relates to telemetering apparatus and more particularly to a frequency shift transmitter and receiver operable at three frequencies and adapted to be connected by a single carrier channel.

In telegraph systems, signal pulses of two types are ordinarily utilized and it is common practice to designate one pulse a MARK signal and the other a SPACE signal. In a frequency modulated system of telegraphy, the MARK signals sent over a communication link may comprise, for example, a tone of one audio frequency while a SPACE signal comprises a tone of a second audio frequency. Telegraph signals may be generated by teleprinters which control the signal frequency output of the frequency shift transmitter, and the transmitter output is connected over any desired communication link, such as telephone lines, microwave links, power line carrier systems, or the like, to a receiver. The MARK and SPACE signals are distinguished at the receiver and are effective to cause a desired operation of a teleprinter responsive to the receiver output.

For simple telemetering functions, the teleprinters may be eliminated from the system and suitable transducers may be included in place thereof whereby such system may be used for the control or indication of a two position function. For example, any On-Off function may be controlled or monitored from a remote position by letting the MARK signal represent the On function and the SPACE signal represent the Off function. If three functions are to be accommodated on a full FM basis by the use of such equipment, it will be apparent that an additional transmitter, receiver and carrier channel are necessary to represent the third function. With the system of this invention, three functions may be accomodated on a full FM basis without the need for additional transmitters and receivers by use of a novel transmitter and receiver which are provided with three operating frequencies whereby each of the three functions is indicated by an individual frequency. Not only is the need for additional transmitters and receivers eliminated, but a single carrier channel may be used to accommodate the three frequencies. Thus, for example, a Raise-Off-Lower function may be controlled or supervised by letting the MARK signal represent the Raise function, the SPACE signal represent the Lower function, and a Center frequency represent the Off function. This invention is directed to a telemetering system employing a novel transmitter and receiver for the generation and reception of three operating frequencies, which transmitter and receiver function on a single carrier channel for control or supervision of a three position function on a full FM basis.

An object of this invention is the provision of a three function telemetering arrangement operable on a full frequency shift basis in a single frequency channel.

An object of this invention is the provision of a frequency shift telemetering transmitter for the generation of any one of three frequencies to provide Raise-Off-Lower operation over a single frequency channel on a full frequency shift basis.

An object of this invention is the provision of an oscillator keying circuit of the two-wire type for control of a frequency shift transmitter operable on any one of three frequencies.

An object of this invention is the provision of an oscillator keying circuit for shifting the frequency of oscillation of a tuned frequency oscillator which normally functions at a predetermined center frequency to either a higher or lower frequency, which keying circuit includes first and second capacitors connected to the said tuned oscillator circuit through first and second diode switching circuits, the first diode switching circuit being normally closed to include the first capacitor in the tuned oscillator circuit and the second diode switch circuit being normally open to effectively isolate the said second capacitor from the tuned oscillator circuit, and control means for individually opening the first diode switching circuit and closing the second diode switching circuit.

An object of this invention is the provision of a telemetering receiver responsive to inputs of three frequencies for three function operation.

An object of this invention is the provision of a discriminator circuit comprising first and second parallel resonant tank circuits tuned to first and second frequencies, respectively, first and second conductive load circuits connected to each resonant tank circuit through first and second pairs of diode rectifiers, the diode polarities being such that unidirectional signal pulses of a first and second polarity are produced at the respective first and second load circuits with a first frequency input to the discriminator, and unidirectional signal pulses of opposite polarity being produced at the said load circuits with a second frequency input to the discriminator.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views.

Figure 1:
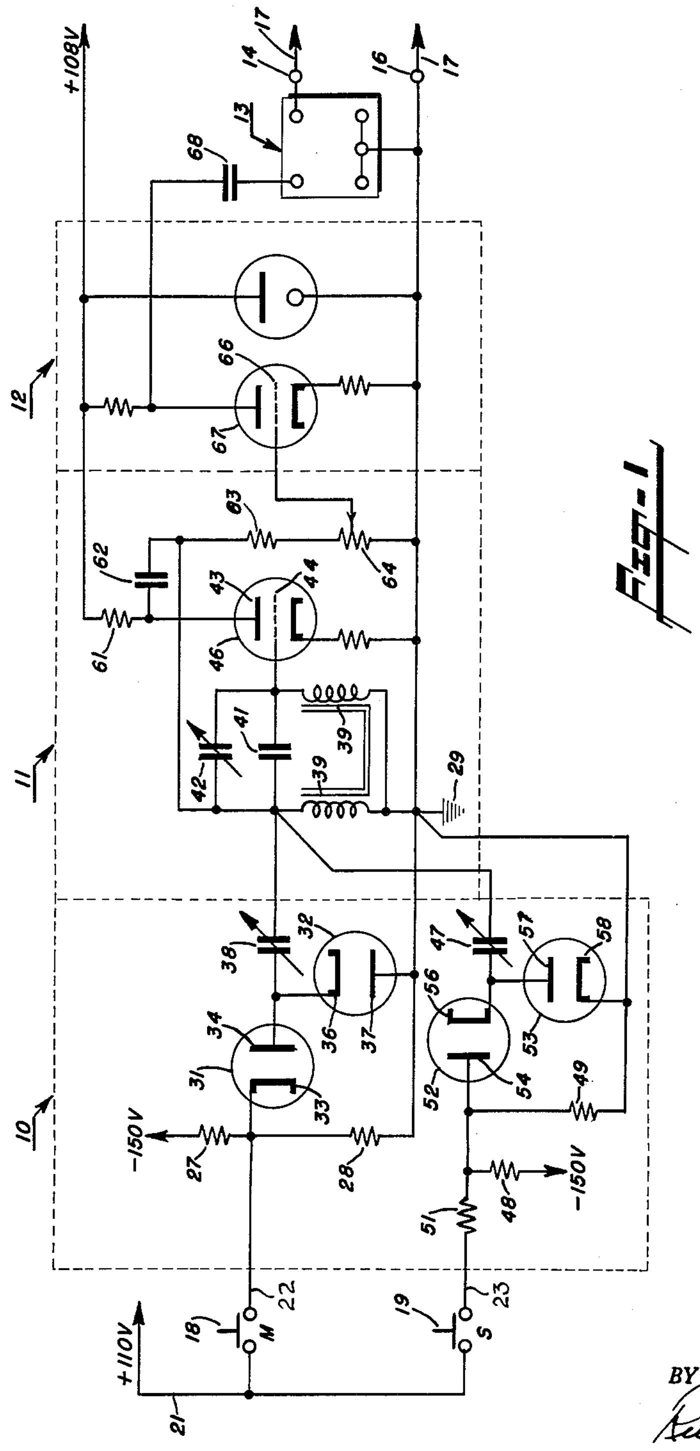
FIGURE 1 is a schematic circuit diagram of a frequency shift transmitter including a keying circuit therefor connected in a three wire control arrangement and embodying this invention.

Reference is first made to FIGURE 1 of the drawings wherein there is shown a transmitter which includes an oscillator keying circuit 10 connected to a frequency shift oscillator 11. The oscillator output is connected through a buffer amplifier 12 and band pass filter 13 to output terminals 14 and 16, which terminals are connected through a two wire connecting link 17 to the input terminals of the receiver shown in FIGURE 2. A standard, or three wire, control means, or circuit, for the keying circuit 10 is provided, in the manner illustrated in FIGURE 1, by a pair of switches 18 and 19. With both switches 18 and 19 in the illustrated open position, the transmitter output comprises a center frequency of, say, 935 cycles per second. When the switch 18 is closed, the transmitter is shifted to a MARK signal frequency of, say, 977.5 cycles per second, and when the switch 19 is closed, the transmiter is shifted to a SPACE signal frequency of, say, 882.5 cycles per second. In a three function control arrangement, the MARK, SPACE and CENTER frequencies may be used to provide the Raise, Lower and Off operations, respectively, for example.

Before describing the transmitter in detail, it will be apparent that three function operation may be provided with an ordinary telegraph transmitter having only two frequency outputs comprising MARK and SPACE signals to repersent the respective Raise and Lower operations, for example, with the Off operation being represented when the transmitter is removed from the line or is not oscillating. Frequency shift channels are, however, most vulnerable to noise when no signal is being transmitted. Hence, by providing a third center Off frequency, a substantially steady state signal is received by the receiver for maximum protection against noise keying the channel. Other advantages of a three frequency system will become apparent in the following detailed description of the apparatus.

Continuing the description of the transmitter of FIGURE 1, one side of each of the switches 18 and 19 of the control means are connected together and through a lead wire 21 to a positive 110-volt source, not shown, but which may be contained in the transmitter, while the other switch terminals are connected through lead wires 22 and 23 to the keying circuit 10. In the illustrated arrangement, utilizing the switches 18 and 19 which are located externally of the transmitter, three wires 21, 22 and 23 are necessary to connect the switch control means to the transmitter. (In the modified embodiment of FIGURE 4, only two wires are needed in the connection of the control means to the oscillator keying circuit.)

Included in the keying circuit are a pair of series connected resistors 27 and 28 comprising a voltage dividing network between a negative 150-volt supply and a common ground, designated 29. Series connected clamping, or switching, elements comprising diodes 31 and 32, in the illustrated embodiment, are connected in shunt with the voltage divider resistor 28, the diodes being poled in the same sense with the cathode 33 of the one diode 31 being connected to the junction between the resistors 27 and 28, the anode 34 of the diode 31 being connected to the cathode 36 of the diode 32, and the anode 37 of the diode 32 being connected to the common ground 29. The junction between the connected anode 34 and cathode 36 of the diodes 31 and 32 is connected to a first capacitor 38 included in a tuned circuit comprising a portion of the oscillator 11.

The oscillator tuned circuit comprises an inductance 39 and shunt connected capacitor 41 and variable trimming capacitor 42, the tuned circuit being included in a feedback circuit of the oscillator between the anode 43 and grid 44 of an oscillator tube 46. With the switch 18 in the illustrated normally open position, the negative 150-volt supply across the voltage dividing resistors 27 and 28 results in a negative potential on the cathode 33 of the diode 31, whereby the diodes 31 and 32 normally conduct and clamp, or connect, the capacitor 38 to A.-C. ground potential. If the switch 19 is also in the illustrated normally open position, the oscillator tuned circuit includes the capacitors 38, 41 and 42 and the inductor 39 and oscillations at a center "off" frequency are produced. When the switch 18 is closed, the positive 110-volt source is applied to the cathode 33 of the diode 31 preventing conduction of the diodes 31 and 32. The capacitor 38 is thereby disconnected, or unclamped, from the common ground potential and is effectively removed from the oscillator tuned circuit. The frequency of oscillation of the oscillator thereby increases to a MARK (or Raise) frequency.

In accordance with this invention, a second capacitor 47 is included in the oscillator which capacitor may be effectively removed from the oscillator tank circuit, or included therein to provide the SPACE (or lower) frequency of operation. It will be noted that the keying circuit 10 includes a second voltage dividing network comprising series connected resistors 48 and 49 connected between the negative 150-volt supply and the common ground potential 29. The lead wire 23 from the switch 19 is connected through a current limiting resistor 51 to the junction between the voltage dividing resistors 48 and 49. A second pair of series connected switching, or clamping, elements comprising diodes 52 and 53 in the illustrated embodiment are connected in shunt with the voltage dividing resistor 49, the diodes being poled in the same sense with the anode 54 of the one diode being connected to the junction between the resistors 48 and 49, the cathode 56 of the diode 52 being connected to the anode 57 of the diode 53, and the cathode 58 of the diode 53 being connected to the common ground 29. The junction between the connected cathode 56 and anode 57 of the diodes 52 and 53 is connected to the capacitor 47 in the oscillator tuned circuit. With the switch 19 in the illustrated normally open position, the negative 150-volt supply across the voltage dividing resistors 48 and 49 results in a negative potential on the anode 54 of the diode 52 whereby the diodes normally are cut off. The capacitor 47 is thereby normally disconnected, or unclamped, from the common ground potential and is effectively disconnected, or isolated, from the circuit. When the switch 19 is closed, the positive 110-volt source is applied to anode 54 of the diode 52 whereby the diodes 52 and 53 conduct and clamp, or connect, the capacitor 47 to a ground potential. The frequency of oscillation of the oscillator is thereby decreased to a SPACE (or Lower) frequency.

It will here be noted that the polarity of the supply potentials to the keying circuit 10 and the poling of the diodes incorporated in the keying circuit are all relative and may, therefore, be reversed without effectively changing the operation thereof. In setting up the three oscillator frequencies, the capacitor 42 is first tuned for a MARK frequency output from the oscillator with the switch 18 closed. Next, the capacitor 38 is tuned for Center frequency oscillation of the oscillator with both switches 18 and 19 open and, finally, the capacitor 47 is tuned for a SPACE frequency output with the switch 19 in a closed position.

The oscillator and remainder of the transmitter may be of conventional design with the oscillator tube anode 43 being connected through an anode load resistor 61 to a positive 108-volt supply. A coupling capacitor 62, resistor 63, and potentiometer 64 connect the oscillator output to the control grid 66 of an electron tube 67 included in the buffer amplifier 12. The buffer amplifier output is connected through a coupling capacitor 68 and the band-pass filter 13 to the connecting link 17. With the transmitter in operation, it will be apparent that a Mark, Space or Center frequency is supplied to the line 17 at all times, the frequency depending upon the condition of the switches 18 and 19 in the control circuit.

Figure 2:
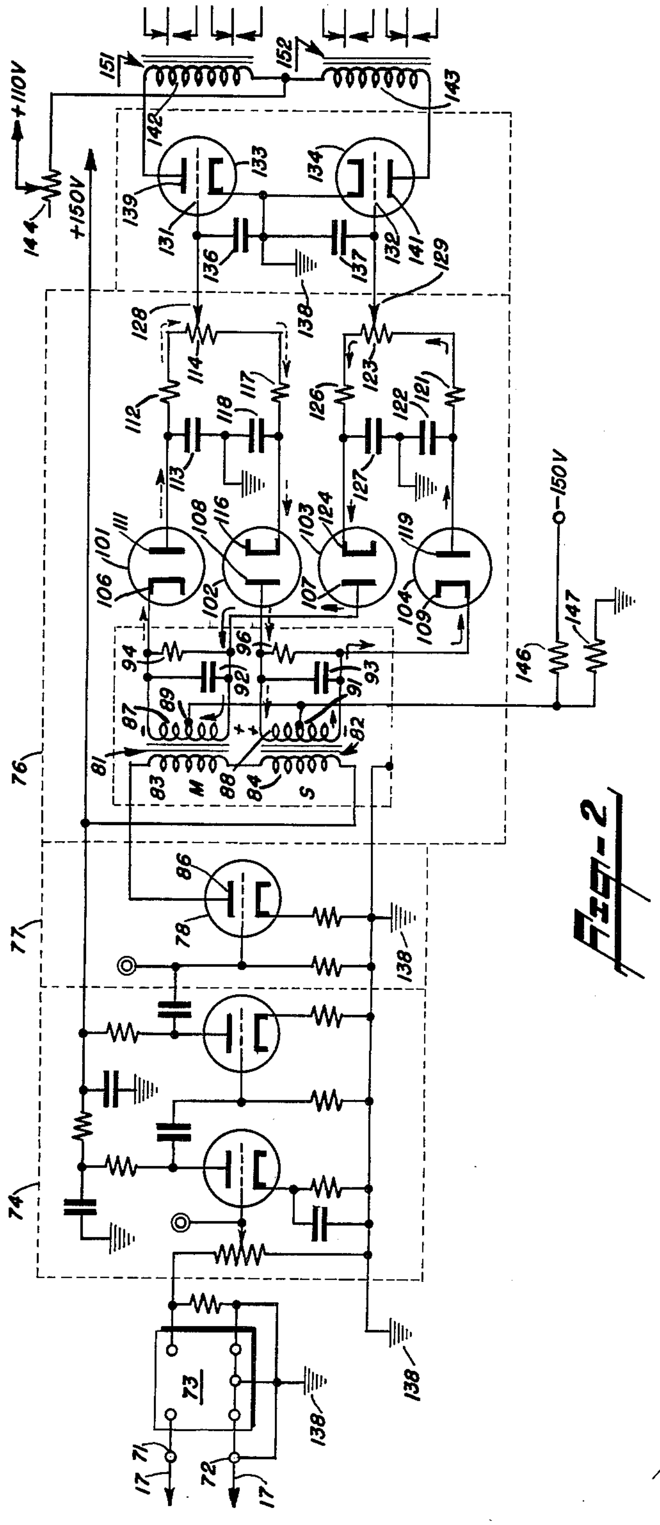
FIGURE 2 is a schematic circuit diagram of a receiver responsive to the transmitter output and embodying this invention.

Reference is now made to FIGURE 2 wherein it will be seen that the connecting link 17 from the transmitter connects to the input terminals 71 and 72 of a receiver which may include a band-pass filter 73 tuned to the same carrier frequency channel as the transmitter band-pass filter 13. The filtered signals from the connecting link passing through the receiver band-pass filter are applied to a limiting amplifier 74 which may be of conventional design and utilizing, for example, several resistance-capacitance coupled stages, each operating as a limiting amplifier stage. The limited signals are applied to a novel tuned discriminator 76 of this invention, through a discriminator driver stage 77 which includes an electron tube 78.

Figure 3:
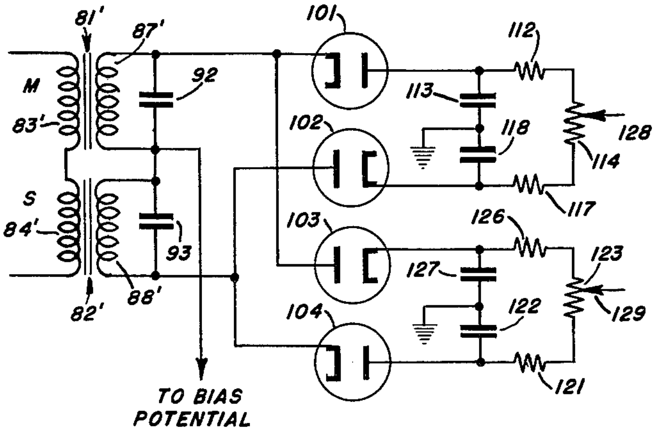
FIGURE 3 is a schematic circuit diagram of a modified discriminator circuit.

The novel discriminator of this invention includes first and second transformers 81 and 82 each having a primary winding 83 and 84, respectively, which primary windings are connected in series circuit between the anode 86 of the driver tube 78 and a positive 150-volt supply; the transformers comprising an anode load for the driver tube 78. The transformers 81 and 82 each include a secondary winding 87 and 88, respectively, which, in the illustrated embodiment of FIGURE 2, are provided with center taps 89 and 91, respectively. In a modified embodiment of this invention shown in FIGURE 3, no center taps on the secondary windings are required. Capacitors 92 and 93 in shunt with the secondary windings 87 and 88 tune the transformer secondary windings; the winding 87 being tuned, for example, to a MARK signal frequency, which, for purposes of illustration, has been chosen as 977.5 cycles per second, while the winding 88 is tuned, for example, to a SPACE signal frequency of 882.5 cycles per second in the illustrated system. Resistors 94 and 96 in shunt with the parallel-resonant circuits increase the band width thereof a desired amount. It will be understood, however, that it is not necessary or always advisable to tune the windings to the MARK and SPACE signal frequencies. The discriminator windings are tuned for peak response from on MARK or SPACE frequency to, say, twice the frequency shift from CENTER frequency. Thus, in the illustrated arrangement, the winding 87 is tuned to a frequency between 977.5 and 1020 cycles per second while the winding 88 is tuned to a frequency between 850 and 882.5 cycles per second. With a MARK signal input to the discriminator transformers, a maximum signal is developed across the tuned transformer secondary winding 87 while a SPACE signal input thereto produces a maximum signal at the winding 88. At MARK signal frequency, a signal is developed across the winding 88 which is on the order of 10 to 12 db below the signal at the winding 87 since such winding is parallel resonant tuned at or adjacent the SPACE frequency and, similarly, at space signal frequency, a signal is developed across the winding 87 which is on the order of 10 to 12 db below the signal at the winding 88 since such winding is parallel resonant tuned at or adjacent the MARK frequency. In similar manner, at Center frequency, substantially equal signals are developed across both secondary windings 87 and 88. Thus, it will be understood that, due to the bandwidth of the tuned circuits with a SPACE or MARK signal frequency, the voltage across the respective MARK and SPACE windings 87 and 88 is substantial and is measurable, but is only about ⅓ to ¼ of the voltage across the respective SPACE and MARK windings. Thus, it is seen that the voltages across the windings 87 and 88 are never negligible if a MARK, SPACE or CENTER signal frequency is present.

The output from the MARK and SPACE transformers 81 and 82 are applied to half-wave rectifiers comprising diodes 101, 102, 103 and 104. As illustrated in FIGURE 2, one end of the winding 87 is connected to the cathode 106 of the diode 101 while the other end thereof is connected to the anode 107 of the diode 103. Further, one end of the winding 88 is connected to the anode 108 of the diode 102 while the other end thereof is connected to the cathode 109 of the diode 104. The anode 111 of the diode 101 is connected through an R-C filter network comprising a series resistor 112 and shunt capacitor 113 to one end of a conductive load circuit comprising a potentiometer 114, while the cathode 116 of the diode 102 is connected through a filter comprising a series resistor 117 and shunt capacitor 118 to the other end of the load 114. Similarly, the anode 119 of the diode 104 is connected through an R-C filter network comprising a series resistor 121 and shunt capacitor 122 to one end of a conductive load circuit comprising a potentiometer 123, while the cathode 124 of the diode 103 is connected through a filter comprising a series resistor 126 and shunt capacitor 127 to the other end of the potentiometer load 123.

The movable arms 128 and 129 of the potentiometers 114 and 123 are connected to the control elements, or grids, 131 and 132 of output keying members, or tubes 133 and 134, respectively. Shunt-connected capacitors 136 and 137 in the input circuits of the keying tubes provide additional filtering of the rectified outputs. The cathodes, or common elements, of the output keying tubes are connected to a common ground potential 138 while the output elements, or anodes 139 and 141 are connected through individual relay control windings 142 and 143 and a potentiometer 144 to a positive 110-volt supply.

The output keying tubes 133 and 134 are normally cut off by means of a biasing network comprising series connected voltage dividing resistors 146 and 147 connected across a negative 150-volt supply. The junction between the resistors, which is at a potential of about −12 volts, is connected to the center taps 89 and 91 on the secondary windings 87 and 88. The negative bias, coupled through the diode rectifiers in the transformer outputs, and the load circuits 114 and 123, is sufficient to normally cut off both the output keying tubes 133 and 134 whereby no current flows through the control windings 142 and 143 of the relays designated 151 and 152. The relay contacts may be included in any desired control or indicating circuit not shown in the drawings.

The operation of the discriminator 76 with MARK, SPACE and CENTER frequency inputs thereto will now be described. Assuming a MARK, or first, signal input is applied to the receiver, a maximum A.-C. signal is developed across the parallel resonant tank circuit comprising the winding 87 and capacitor 92 tuned to such MARK signal frequency. During the half cycle in which the upper end of the winding 87 is negative and the lower end thereof is positive with respect to the center tap thereon, as illustrated by the polarity markings, a signal current pulse from the upper half of the winding 87 (as a result of the MARK signal input) will flow through the diode 101 and load resistor 114 and back to the center tap 89 through the diode 102 and portion of the winding 88, in the path of the broken line arrows. The potential of the movable arm 128 of the load circuit and control grid 131 connected thereto thereby becomes increasingly negative with respect to the constant D.-C. bias thereat. The tube 133 is thereby driven further into the cut off region to produce no resultant change in the operating state of the tube, which is normally cut off.

During the same half cycle described above, the lower end of the upper winding 87 is positive with respect to the center tap potential thereby placing the diode 103 in a state of conduction. The current flow path may be traced from the center tap 89 on the winding 87 through the diode 104, load circuit 123, and diode 103 to the positive end of the winding 87, as illustrated by the solid arrows. Thus, the potential at the movable arm 129 of the load circuit and control grid 132 connected thereto, becomes increasingly positive with respect to the constant D.-C. bias thereat. The relatively positive signal is sufficient to place the keying tube 134 in a conducting state, whereupon current flows through the relay winding 143 comprising the anode load thereof to energize the relay 152.

During opposite half cycles during which the upper end of the winding 87 is positive and the lower end is negative with respect to the center tap, the diode rectifiers block conduction to the load circuits 114 and 123 whereby it will be seen that one-half wave rectification is provided. The current pulses provided during diode conduction serve to charge the filter capacitors in the diode output circuits to provide an output potential across the load resistors during the entire time the diodes are cut off. Hence, the output keying tube 134 will conduct during the entire operating cycle with a MARK signal input to the discriminator.

With a SPACE, or second signal input to the receiver a maximum A.C. signal is developed across the parallel resonant tank circuit comprising the winding 88 and capacitor 93 tuned to such SPACE signal frequency. During the half cycle of SPACE signal wherein the upper end of the winding 88 is positive and the lower end thereof is negative with respect to the center tap thereon, as illustrated by the polarity markings adjacent the winding 88, current from the lower half of the winding flows through the diode 104, load 123 and diode 103 to provide a negative potential at the load resistor 123, with respect to the potential at the center tap 91. The relatively negative signal drives the grid 132 of the output keying tube further into cut off whereby no change in the operating state of the tube is effected Simultaneously, the positive potential at the upper end of the winding 88 is coupled through the diode 120 to the load resistor 114, the current flow path being traceable from the center tap on the winding 88 through the diode 101, load 114, and diode 102 to the winding 88. The relatively positive potential at the movable arm 128 and control grid 131 is sufficient to cause conduction of the keying tube 133 and consequent energization of the relay 151 having the control winding 142 in the anode load circuit of such tube. During opposite half cycles of operation with a SPACE signal input, the diode rectifiers block conduction to the loads 114 and 123, however, the charged filter capacitors maintain the output potentials across the load potentiometers 114 and 123 at a sufficient level to thereby maintain the tube 133 in a conducting state during the time the diodes block conduction. The solid and broken line arrows indicate the current path also for lower and upper winding halves of the transformer winding 88 with a SPACE signal input during the half cycle of operation indicated by the polarity markings adjacent the winding ends.

With a CENTER frequency input to the receiver, both transformer windings 87 and 88 operates at frequencies substantially equally spaced from the CENTER frequency such that the voltages developed thereat are substantially equal whereby substantially no discriminator output is provided. Hence, the D.C. bias potential maintains the tube 133 and 134 in the cut off condition and the relays 151 and 152 remain deenergized.

With the discriminator of this invention, the frequency at which each of the relays 151 and 152 pull in is individually adjustable by the respective potentiometers 114 and 123. In adjusting the potentiometers 114 and 123, the following procedure is followed. An audio oscillator is connected to the input terminals 71, 72 of the receiver with the receiver removed from the connecting link 17. The audio oscillator is adjusted to a frequency intermediate the CENTER and MARK frequencies and the movable arm 129 is adjusted to the point where the relay 152 just pulls in. Similarly, the audio oscillator is adjusted to a frequency intermediate the CENTER and SPACE frequencies, and the movable arm 128 is adjusted to the point where the relay 151 just pulls in. Ordinarily, the frequencies chosen for such adjustments are those midway between the CENTER and MARK frequencies and the CENTER and SPACE frequencies, respectively. It will be apparent, however, that with the individual adjustments, one relay operation may be obtained with a greater safety factor than the operation of the other relay, if desired.

Reference is now made to FIGURE 3 of the drawings wherein there is shown a discriminator which is similar to the discriminator shown in FIGURE 2 and described above; the discriminator of FIGURE 3, however, employing transformers 81' and 82' having secondary winding 87' and 88' with no center taps. The one winding 87' is parallel resonant tuned to a MARK frequency (or any frequency from the MARK frequency to, say, twice the frequency shift from CENTER frequency in the direction of the MARK frequency) while the other winding 88' is parallel resonant tuned to a SPACE frequency (or any frequency from the SPACE frequency to, say, twice the frequency shift from CENTER in the direction of the SPACE frequency). A bias supply of proper potential is connected to the junction between the interconnected transformer secondary windings 87' and 88'. With a MARK signal input to the transformers, a negative output potential is developed at the movable arm 128 during one half cycle of operation and a positive potential (with respect to the bias potential) is developed at the movable arm 129 during the other half cycle; the conducting path being through the diode 101, load 114 and diode 102 during the one half cycle of operation, and through the diode 104, lead 129 and diode 103 during the other half cycle of operation. With a SPACE signal input, the winding 88' is resonated whereby a positive output potential (with respect to the bias potential) is developed at the movable arm 128 during one half cycle of operation and a negative potential is developed at the movable arm 129 during the other one half cycle of operation. The remainder of the circuit may be identical to that shown in FIGURE 2 and described above. In both the FIGURES 2 and 3 discriminators, the diodes of a first pair of diode rectifiers (101 and 102) are connected together through a first conductive load circuit which includes the potentiometer 114, while the diodes of a second pair of diode rectifiers (103 and 104) are connected together through a second conductive load circuit which includes the potentiometer 123. Each of the above series connected circuits is connected to both parallel-resonant tuned tank circuits, tuned to a first and second (MARK and SPACE) frequency, respectively. Filtered unidirectional signal pulses of a negative polarity are produced at the potentiometer 114 and filtered unidirectional pulses of a positive polarity are produced at the potentiometer 123 with a MARK frequency input to the discriminator, while pulses of opposite polarity are produced thereat with a SPACE signal input. Substantially no pulses are produced thereat with a CENTER frequency input signal to the discriminator.

Figure 4:
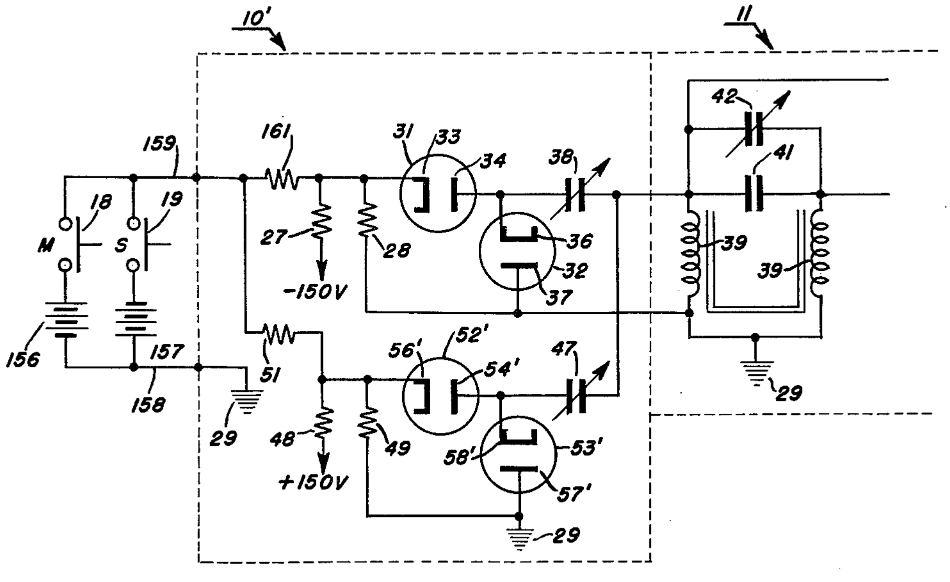
FIGURE 4 is a schematic circuit diagram of a modified transmitter keying circuit connected in a two wire, or polar, control arrangement.

Reference is now made to FIGURE 4 of the drawings wherein there is shown a modified oscillator keying circuit, designated 10', embodying this invention, which keying circuit requires only two wires to the input thereof rather than three wires as shown in FIGURE 1. The two wire, or polar, control circuit arrangement includes the MARK and SPACE switches 18 and 19, respectively, and positive and negative 110-volt D.C. keying voltage sources 156 and 157 in series with the respective switches. One lead wire 158 connects the potential sources 156 and 157 to the common ground 29 in the transmitter, while a second lead wire 159 connects the interconnected switch terminals to the transmitter.

The MARK frequency producing section of the keying circuit 10' is identical with the corresponding section thereof shown in FIGURE 1, with the additional of a current limiting resistor 161 in series circuit between the lead wire 159 and cathode 33 of the diode 31. With the switch 18 closed (and the switch 19 open) the positive 110 volt source 156 is applied to the cathode 33 of the diode 31 preventing conduction of the diodes 31 and 32 and disconnecting, or unclamping, the capacitor 38 in the oscillator circuit 11 from the common ground potential. The capacitor 38 is effectively removed, or isolated, from the oscillator tuned circuit and the frequency of oscillation thereby increases to a MARK frequency. With the switch 18 open (and the switch 19 also open) the negative 150-volt supply across the voltage dividing resistors 27 and 28 results in a negative potential in the cathode 33 of the diode 31 whereby the diodes 31 and 32 normally conduct to clamp, or connect, capacitor 38 to A.C. ground potential.

In the keying circuit 10', the voltage divider network comprising the resistors 48 and 49 are connected to a positive (rather than negative) 150-volt supply. Further, the polarity of the second pair of switching diodes, here designated 52' and 53', is reversed from the diodes 52 and 53 shown in FIGURE 1. It will be seen that the positive 150-volt supply connected to the cathode 56' of the diode 52 through the voltage dividing network serves to normally cut off the diodes 52' and 53'. The postive potential on the cathode 56' is merely increased when the switch 18 is closed and the diodes 52' and 53' remain cut off. When the switch 19 is closed, however, the negative 110-volt source 157 is applied through the current limiting resistor 51 to the cathode 56' of the diode 52' whereby the diodes 52' and 53' conduct and clamp, or connect, the capacitor 47 to A.-C. ground potential. The oscillator frequency is thereby decreased to a SPACE signal frequency. With the switch 19 normally open and the diodes 52' and 53' cut off, the capacitor 47 is disconnected, or unclamped, from ground and thereby effectively isolated, or removed, from the oscillator tank circuit.

Having now described this invention in detail, in accordance with the requirements of the patent statutes, various changes and modifications will suggest themselves to those skilled in this art. For example, the capacitors 38 and 47 in the oscillator keying circuits of FIGURES 1 and 4 could be replaced with other frequency determining elements, such as inductors, whereby such inductors are added or removed from the oscillator tuned circuit for shifting the frequency thereof. In the claims, the term reactive element is used to include both capacitors and inductors. In addition, the switching means in the transmitter are not limited to diodes, as described, since any suitable switches such as transistors, or the like, may be utilized. Further, the parallel-resonant tank circuits employed in the discriminator circuit may obviously be replaced with series resonant circuits, if desired, and where half-wave rectification is shown, full-wave rectification may be employed. It is intended that these, and other such changes and modifications, may be made without departing from the spirit and scope of the invention as defined in the following claims.

I claim:

1. In a transmitter of the type which includes only one normally functioning oscillator having a tuned circuit resonant at a predetermined frequency, an oscillator keying circuit for shifting the frequency of oscillation to a frequency which is either higher or lower than the said predetermined oscillator frequency, the said keying circuit comprising first and second switching circuits, first and second capacitors directly connecting the respective first and second switching circuits to the said tuned oscillator circuit, the first switching circuit when closed including the said first capacitor in the tuned oscillator circuit and the second switching circuit being normally open to effectively remove the said second capacitor from the tuned oscillator circuit, and control means for individually closing and, opening the first switching circuit and closing and opening the second switching circuit.

2. The invention as recited in claim 1 wherein said first switching circuit comprises a first pair of series connected diodes poled in the same direction and normally biased for conduction, the said second switching circuit comprising a second pair of series connected diodes poled in the same direction and normally biased to cut off, the said first and second capacitors being connected to the respective junctions between the diodes of the first and second pairs of diodes, and means individually connecting the control means to the said first and second pairs of switching diodes, respectively, for control of the conduction state of the diodes.

3. The invention as recited in claim 2 wherein the control means include first and second switches, a D.-C. supply source connected to one terminal of each switch, means connecting the first switch to only the first pair of switching diodes and the second switch to only a second pair of switching diodes, the same polarity D.-C. supply source being used for switching both the first and second diode switching circuits.

4. The invention as recited in claim 2 wherein the control means include first and second switches each connected to both the first and second pair of switching diodes, and first and second D.-C. supply sources of opposite polarity connected to the individual switches.

5. In a transmitter of the type which includes only one normally oscillating oscillator having a tuned circuit resonant at a predetermined frequency, an oscillator keying circuit for shifting the oscillator frequency of oscillation to a frequency either higher or lower than the said predetermined frequency, the said keying circuit comprising first and second capacitors connected to the oscillator tuned circuit, first and second switching circuits connected to the respective first and second capacitors, the first switching circuit when closed including the first capacitor in the tuned oscillator circuit, the second switching circuit being normally open to effectively remove the second capacitor from the tuned circuit, and control means for individually closing and opening the first switching circuit and closing and opening the second switching circuit to either effectively remove the first capacitor from the tuned circuit thereby raising the oscillator frequency or to effectively connect the second capacitor in operative relation with the tuned circuit thereby lowering the oscillator frequency.

6. In a transmitter of the type which includes an oscillator having a tuned circuit, an oscillator keying circuit connected to said tuned circuit for shifting the frequency of oscillation of the said oscillator, the said oscillator keying circuit comprising first and second reactive elements and a pair of normally open switches, wherein one of said switches when closed removes one of said reactive elements from said tuned circuit and changes the frequency of oscillation in one direction and the other switch when closed effectively connects the other reactive element in said tuned circuit and changes the frequency of oscillation in the other direction, whereby oscillations of a selected one of three frequencies may be produced by said oscillator.

7. In a transmitter as recited in claim 6, wherein the frequency of oscillation is lower than one kilocycle per second.

References Cited by the Examiner

UNITED STATES PATENTS

| | | | |
|---|---|---|---|
| 1,452,339 | 4/1923 | Heising | 331—179 |
| 1,930,046 | 10/1933 | Hammond | 325—30 |
| 2,553,366 | 5/1951 | Fry | 331—161 |
| 2,567,194 | 9/1951 | Earp | 329—112 |
| 2,572,512 | 10/1951 | Pappenfus | 331—179 |
| 2,735,940 | 2/1956 | Norby | 331—161 |
| 2,797,313 | 6/1957 | Wasmansdorff | 325—163 |
| 2,819,398 | 1/1958 | Scoville | 329—112 |
| 2,909,606 | 10/1959 | Wennemer | 325—320 |
| 2,947,814 | 8/1960 | Haner | 331—179 |
| 2,968,767 | 1/1961 | White | 329—112 |

NEIL C. READ, *Primary Examiner.*

L. MILLER ANDRUS, *Examiner.*

T. B. HABECKER, L. A. HOFFMAN, *Assistant Examiners.*